US Patent 2,796,432
Patented June 18, 1957

2,796,432

α-(2,4,6-TRIIODOPHENOXY)BUTYRIC ACID AND ITS PREPARATION

Joseph Redel and Jacques Maillard, Paris, France, assignors to Chimie et Atomistique, Paris, France, a French body corporate No Drawing. Application January 26, 1954, Serial No. 406,359

Claims priority, application France August 7, 1953

8 Claims. (Cl. 260—521)

The present invention has for object to provide, as a new product, a chemical compound: α(2,4,6-triiodophenoxy) butyric acid of formula

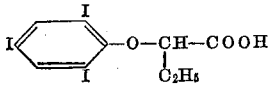

This compound, which melts at 124–125° C., is of use particularly in cholecystography, i. e. as an agent for rendering the gall-bladder opaque for X-ray examination. It is only very slightly toxic and has the particularly useful property of rendering opaque in a remarkable manner not only the gall-bladder but also the bile ducts. It is moreover, under the conditions of use, well tolerated by the organism, as has been demonstrated by many experiments. All these properties are rarely united in one compound; the new compound according to the invention is therefore of particular interest in its application in cholecystography.

The invention also has for object to provide a process of preparing this compound which is characterized in that it comprises the steps of condensing 2,4,6-triiodophenol with an α-halogenated butyric acid ester such as ethyl α-bromobutyrate, in the presence of an alkaline alcoholate, such as sodium ethylate, and thereafter saponifying the α(2,4,6-triiodophenoxy) butyric acid ester thus obtained.

The condensation may be diagrammatically expressed thus:

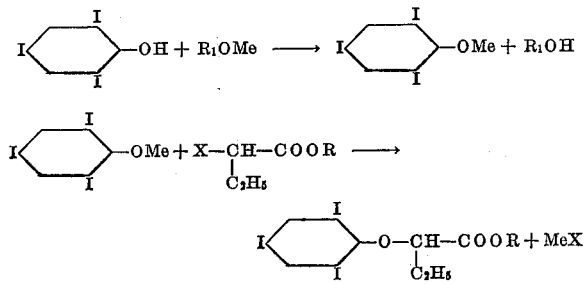

in which reaction X is a halogen, preferably bromine, R and R₁ are each an alcoholic residue such as an ethyl radical, and Me is an alkaline metal.

The condensation is preferably effected by refluxing the reactants in an alcohol identical to that entering into the composition of the alcoholate.

The saponification may be carried out according to conventional methods.

The following example of the preparation of the new compound is given merely by way of illustration.

Example

To a solution of sodium ethylate, prepared with 2.80 g. (0.12 at. g.) of sodium in 50 cc. absolute alcohol, there are added 47.20 g. (0.10 mol) of triiodophenol and, while stirring and maintaining the mixture at a slow boil, 24.50 g. (0.13 mol.) of ethyl α-bromobutyrate drop by drop over a period of 1 hour. The mixture is refluxed for 3 hours. The mixture is cooled and there is added thereto a large volume of ice water which dissolves the precipitated sodium bromide and separates the ester in the form of an oil which is extracted with ether. The ethereal solution is washed with ice water, containing 5% sodium hydroxide which removes the remaining traces of triiodophenol, washed with water, dried and evaporated; the residue is heated in a vacuum in a water-bath so as to evaporate off the excess brominated ester.

The raw ester is thereafter saponified by refluxing for 1 hour with 120 cc. of 5% alcoholic sodium hydroxide solution. The cooled solution is greatly diluted and acidified by 10% hydrochloric acid. The semi-crystalline oil which separates out is extracted with ether and the solution is separated, washed with water and dried over anhydrous sodium sulfate. The ethereal solution is concentrated in the water-bath and petroleum ether is added thereto until a cloud appears; the product crystallizes at 0° C. After recrystallization in an ether-petroleum ether mixture or ethyl acetate-petrol ether mixture the pure acid melts at 124–125° C. Weight: 30 to 31g. Yield: 54 to 55%.

It should be understood that the invention is not limited to the mode of carrying out the invention hereinbefore described, which has been given merely by way of example, and changes and modifications may be made therein that fall within the scope of the appended claims.

Having now described our invention what we claim as new and desire to secure by Letters Patent is:

1. α-(2,4,6-triiodophenoxy) butyric acid.
2. As a new compound, of use particularly in cholecystography: α(2,4,6-triiodophenoxy) butyric acid of the formula:

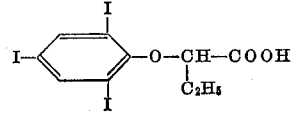

3. Process of preparing α(2,4,6-triiodophenoxy) butyric acid comprising the steps of condensing 2,4,6-triiodophenol with an α-halogenated butyric acid ester in the presence of an alkaline alcoholate and thereafter saponifying the α(2,4,6-triiodophenoxy) butyric acid ester thus obtained.
4. Process as claimed in claim 3, wherein the α-halogenated butyric acid ester is ethyl α-bromobutyrate.
5. Process as claimed in claim 3, wherein the alkaline alcoholate is sodium ethylate.
6. Process as claimed in claim 3, wherein the condensation is effected by refluxing the reactants in an alcohol identical to that entering into the composition of the alcoholate.
7. Process of preparing α(2,4,6-triiodophenoxy) butyric acid comprising the steps of condensing 2,4,6-triiodophenol with ethyl α-bromobutyrate in the presence of sodium ethylate and thereafter saponifying the α(2,4,6-triiodophenoxy) butyric acid ester thus obtained.
8. Process as claimed in claim 7, wherein the condensation is effected by refluxing the reactants in ethyl alcohol.

References Cited in the file of this patent

FOREIGN PATENTS 507,032    Belgium _____ Nov. 30, 1951

OTHER REFERENCES

Drew et al.: J. A. C. S., vol. 61, p. 2666 (1939).
Long et al.: J. A. C. S., vol. 63, pp. 1586–9 (1941).